(12) United States Patent
Johnson et al.

(10) Patent No.: US 8,117,122 B1
(45) Date of Patent: Feb. 14, 2012

(54) METHODS AND SYSTEMS FOR MANAGING TRANSACTION CARD ACCOUNTS

(75) Inventors: William Johnson, Marietta, GA (US); Craig Vallorano, Long Grove, IL (US)

(73) Assignee: Citicorp Credit Services, Inc., Long Island, NY (US)

( * ) Notice: Subject to any disclaimer, the term of this patent is extended or adjusted under 35 U.S.C. 154(b) by 731 days.

(21) Appl. No.: 11/758,745

(22) Filed: Jun. 6, 2007

Related U.S. Application Data

(60) Provisional application No. 60/811,193, filed on Jun. 6, 2006.

(51) Int. Cl.
*G06Q 40/00* (2006.01)
(52) U.S. Cl. ......................................................... 705/39
(58) Field of Classification Search .................. 705/39
See application file for complete search history.

(56) References Cited

U.S. PATENT DOCUMENTS

| | | | |
|---|---|---|---|
| 6,173,269 B1 * | 1/2001 | Solokl et al. ..................... | 705/35 |
| 2002/0062249 A1 * | 5/2002 | Iannacci ......................... | 705/26 |
| 2002/0069122 A1 * | 6/2002 | Yun et al. ........................ | 705/26 |
| 2003/0097270 A1 * | 5/2003 | Musselwhite et al. ............ | 705/1 |
| 2005/0065877 A1 * | 3/2005 | Cleary et al. .................... | 705/39 |
| 2008/0277465 A1 * | 11/2008 | Pletz et al. ..................... | 235/379 |

* cited by examiner

*Primary Examiner* — Harish T Dass
*Assistant Examiner* — Michael Cranford
(74) *Attorney, Agent, or Firm* — Johnson & Associates

(57) ABSTRACT

Methods and systems for managing transaction card accounts in which cardholders are permitted to incur transaction charge balances on existing transaction card accounts and substituting the existing transaction card for each of at least a portion of the plurality of cardholders with a different transaction card product upon an occurrence of one of termination of a private label or co-branded agreement and a predetermined level of inactivity on the transaction card account which has significant additional features and benefits absent from the existing transaction card product.

13 Claims, 3 Drawing Sheets

| | |
|---|---|
| 10 | Usable in a greater number of transaction types than the private label transaction card |
| 12 | Usable in transactions with a greater number of merchants than the private label transaction card |
| 14 | Provides a first predetermined promotional annual percentage rate of interest, such as zero percent, for any purchase over a first predetermined sum for a first pre-determined period of time |
| 16 | Provides a second predetermined promotional annual percentage rate of interest, such as zero percent, for any purchase over a second predetermined sum that is greater than the first second predetermined sum for a second predetermined period of time that is greater than the first predetermined period of time |
| 18 | Provides a payment hierarchy in which payments are applied first to balances accruing interest at non-promotional annual percentage rates of interest and thereafter to balances accruing interest at a promotional annual percentage rate of interest, such as zero percent |

FIG. 2

METHODS AND SYSTEMS FOR MANAGING TRANSACTION CARD ACCOUNTS

PRIORITY APPLICATION

This application claims priority to co-pending U.S. Provisional Application No. 60/811,193, filed Jun. 6, 2006, entitled "METHODS AND SYSTEMS FOR MANAGING TRANSACTION CARD ACCOUNTS", which is incorporated herein by this reference.

FIELD OF THE INVENTION

The present invention relates generally to the field of transaction cards, and more particularly to methods and systems for managing transaction card accounts.

BACKGROUND OF THE INVENTION

Transaction card issuers, such as banks, often issue credit cards (individually and collectively, "Transaction Cards") under their own marks and/or enter agreements with third parties, (such agreements hereinafter referred to as Private Label or Co-brand Agreements) for the right to issue credit cards branded with or marketed under such third party's marks. From time-to-time and for various reasons, the Private Label or Co-brand Agreements may be terminated by either the bank or the third party. It would be a great benefit to the card issuer to be able to retain existing and generate new balances and receivables for cardholders that were originated through such Private Label or Co-brand Agreements when those agreements are terminated by either the bank or the business.

Further, it is common for cardholders to allow their Transaction Card accounts to remain inactive for extended periods without actually closing the account. With respect to such cardholders, it would likewise be a benefit to the card issuer to be able to retain existing and generate new balances and receivables by stimulating purchasing activity among such inactive cardholders.

There is a current need for a way to enable a bank to be able to retain existing and generate new balances and receivables for cardholders that were originated through Private Label or Co-brand Agreements when those agreements are terminated by either the bank or the third party, and/or in situations in which Transaction Card cardholders allow their accounts to become inactive for extended periods, to retain existing and generate new balances for such cardholders by stimulating purchasing activity among such inactive cardholders.

SUMMARY OF THE INVENTION

It is a feature and advantage of the present invention to provide methods and systems for managing Transaction Card accounts that enable Transaction Card issuers, such as banks, which enter Private Label or Co-brand Agreements for the issuance of Transaction Card accounts, to retain existing and generate new balances and receivables for cardholders that were originated through such agreements when those agreements are terminated by the third party or the bank.

It is a further feature and advantage of the present invention to provide methods and systems for managing Transaction Card accounts that enable banks, with respect to inactive Transaction Card cardholders, to retain existing and generate new balances and receivables for such cardholders by stimulating purchasing activity among such inactive cardholders.

To achieve the stated and other features, advantages and objects, embodiments of the present invention employ computer hardware and software, including, without limitation, instructions embodied in program code encoded on machine readable medium, to provide methods and systems for managing Transaction Card accounts, a first aspect of which enables a Transaction Card issuer to substitute the cardholder's existing Transaction Card account with a different Transaction Card that may be more widely accepted than the cardholder's existing Transaction Card, that has unique pricing benefits in terms of a value proposition for the cardholder, and/or a payment hierarchy that pays off balances subject to promotional APRs after first paying off balances at higher APRs instead of the industry standard of paying off balances at low APRs first. Such substitution may or may not include the transfer of unpaid balances on the existing Transaction Card account to the replacement Transaction Card account.

A second aspect of embodiments of the invention enables the Transaction Card issuer, with respect to inactive Transaction Card cardholders, to retain existing and generate new balances and receivables and extend and prolong the cardholder relationship by stimulating purchasing activity by such inactive cardholders This process utilizes criteria based identification and succession of such cardholders from their existing Transaction Card to the replacement Transaction Card which provides essentially the same value proposition and repayment hierarchy as the first aspect.

Embodiments of the invention propose methods and systems for managing Transaction Card accounts in which, for example, a plurality of cardholders are permitted to incur transaction charge balances on Transaction Card accounts, such as private label or co-brand Transaction Cards, provided for each of the cardholders pursuant to a Private Label or Co-brand Agreement between a card issuer and a third party. According to embodiments of the invention, the private label or co-brand Transaction Card account is replaced with a different Transaction Card product, and the unpaid balances on the existing Transaction Card account may or may not be transferred to the replacement Transaction Card account, either upon the occurrence of the termination of the Private Label or Co-brand Agreement, for example, by the card issuer or the third party, or upon the occurrence of a predetermined level of inactivity on the accounts. In embodiments of the invention, the Transaction Card product which replaces the private label or co-branded Transaction Card may be usable, for example, in a greater number of transaction types and/or with a greater number of merchants than the private label or co-brand Transaction Card, which may be usable, for example, only with the third party.

In further embodiments of the invention, the Transaction Card product which replaces the private label or co-branded Transaction Card account provides a first predetermined promotional annual percentage rate of interest, such as zero percent, for any purchase over a first predetermined sum for a first pre-determined period of time and/or a second predetermined promotional annual percentage rate of interest, which can likewise be zero percent, for any purchase over a second pre-determined sum that is greater than the first predetermined sum for a second predetermined period of time that is greater than the first predetermined period of time. The first and second predetermined promotional annual percentage rates for embodiments of the invention can be, for example, any preferred rates. In addition, in embodiments of the invention, the replacement Transaction Card product provides a payment hierarchy in which payments are applied to balances accruing interest at non-promotional annual percentage rates of interest before balances accruing interest at a promotional annual percentage rate of interest.

The aspect of embodiments of the invention in which the private label or co-branded Transaction Card is replaced upon the occurrence of the predetermined level of inactivity on the accounts, the private label or co-branded Transaction Card accounts on which there has been no activity over a predetermined period of time are identified and a pool of cardholders of the identified accounts that are likely to respond to an offer of the replacement Transaction Card product are selected based at least in part on an application of predefined credit/risk parameters to the identified accounts. Thereafter, according to embodiments of the invention, each cardholder in the selected pool of cardholders may be provided an opportunity to reject a proposal to substitute the cardholder's private label or co-branded Transaction Card account with a different Transaction Card product, and the private label or co-brand Transaction Card account for each cardholder in the selected pool of cardholders who fails to reject the proposal to transfer is replaced with a different Transaction Card product and the unpaid balances on the cardholder's existing Transaction Card account may or may not be transferred to the replacement Transaction Card account.

Additional objects, advantages and novel features of the invention will be set forth in part in the description which follows, and in part will become more apparent to those skilled in the art upon examination of the following, or may be learned from practice of the invention.

BRIEF DESCRIPTION OF THE DRAWINGS

FIG. 2 is a table that illustrates examples of the features and benefits of the Transaction Card product which replaces an existing Transaction Card product for embodiments of the invention.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention.

For example, features illustrated or described as part of one embodiment can be used on another embodiment to yield a still further embodiment. Thus, it is intended that the present invention cover such modifications and variations that come within the scope of the invention. Further, it is to be understood that the terms "Transaction Card" and "credit card" are used herein to denote not only traditional credit card accounts but to include, without limitation, transaction card accounts of all types.

Figure 1:
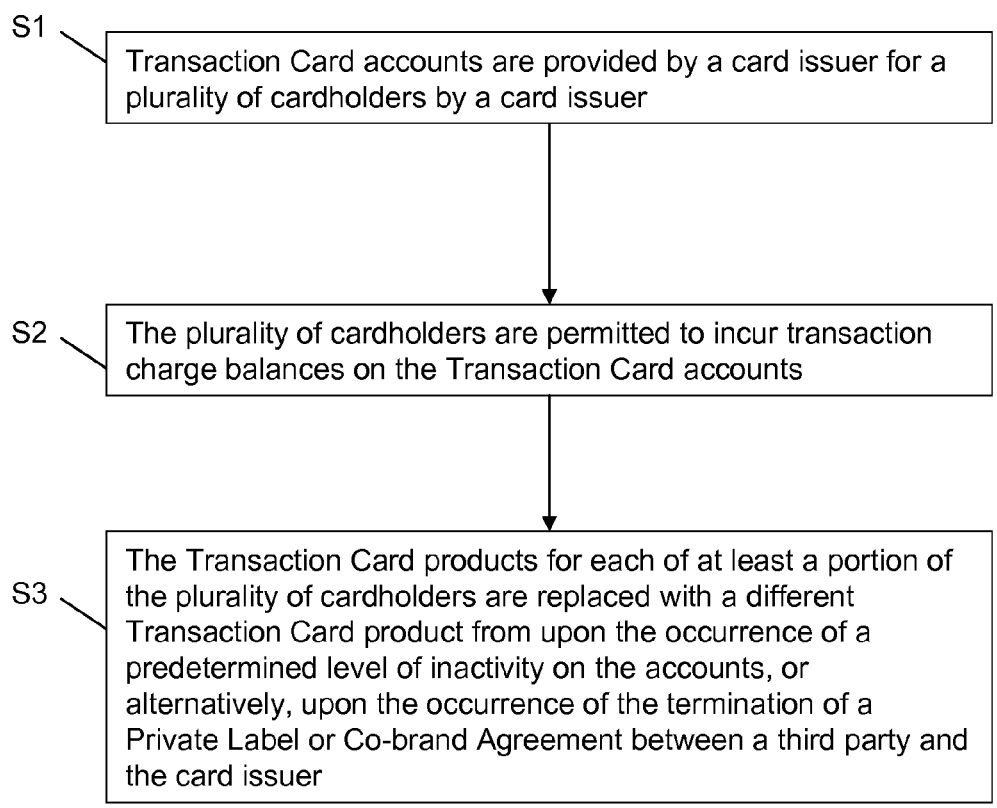
FIG. 1 is a flow chart that illustrates an overview example of the process of managing Transaction Card accounts for embodiments of the invention.

FIG. 1 is a flow chart that illustrates an overview example of the process of managing Transaction Card accounts for embodiments of the invention. Referring to FIG. 1, at S1, Transaction Card accounts are provided by a card issuer for a plurality of cardholders, and at S2, the plurality of cardholders are permitted to incur transaction charge balances on the Transaction Card accounts. At S3, the Transaction Card products for each of at least a portion of the plurality of cardholders are replaced with a different Transaction Card product upon the occurrence of a predetermined level of inactivity on the accounts or upon the occurrence of the termination of a Private Label or Co-brand Agreement between a third party and a card issuer.

A first aspect of embodiments of the invention provides, for example, methods and systems for managing Transaction Card accounts that enable Transaction Card issuers, such as banks, which enter Private Label or Co-brand Agreements with third parties, to retain existing and generate new balances and receivables for cardholders that were originated through such agreements when those agreements are terminated by the third party or the bank.

The first aspect proposes, for example, a product and process that allows the bank to replace a Transaction Card, whether or not issued pursuant to a Private Label or Co-brand Agreement, with a different Transaction Card product, such as a MASTERCARD® product, the features and benefits of which are significantly different from the Transaction Card product to which the cardholder previously had access. FIG. 2 is a table that illustrates examples of the features and benefits of the Transaction Card product which replaces the cardholder's existing Transaction Card for embodiments of the invention. Referring to FIG. 2, such features and benefits include, for example, a Transaction Card product that may be usable in a greater number of transaction types 10 and with a greater number of merchants 12 than the cardholder's existing private label or co-branded Transaction Card product.

Referring further to FIG. 2, the replacement Transaction Card product for embodiments of the invention provides, for example, a first predetermined promotional annual percentage rate of interest, such as zero percent, for any purchase over a first predetermined sum for a first pre-determined period of time 14 and/or also provides a second predetermined promotional annual percentage rate of interest, such as zero percent, for any purchase over a second pre-determined sum that is greater than the first predetermined sum for a second predetermined period of time that is greater than the first predetermined period of time 16. Additionally, the replacement Transaction Card product for embodiments of the invention provides, for example, a payment hierarchy in which payments are applied to balances accruing interest at non-promotional annual percentage rates of interest before balances that are accruing interest at a promotional annual percentage rate of interest 18.

The features and benefits of such a Transaction Card product include, for example, acceptance anywhere a branded product, such as a MASTERCARD® product, is accepted. Additional features and benefits of such a Transaction Card product include, for example, a unique set of pricing benefits in terms of the value proposition to the cardholder. Examples of such value proposition include, without limitation, a zero percent annual percentage rate (APR) for any purchase over a pre-determined sum, such as $99, for a pre-determined period of time, such as three months, and a zero percent APR for any purchase over a greater pre-determined sum, such as $299, for a longer period of time, such as six months. Balances at these promotional APRs are paid off after balances at higher APRs under the repayment hierarchy for the product unlike the industry standard of paying off balances at low APRs first.

A second aspect of embodiments of the invention provides, for example, methods and systems for managing Transaction Card accounts that enable the bank, with respect to inactive Transaction Card cardholders, to retain existing and generate new balances and receivables by stimulating purchasing activity among such inactive cardholders.

Figure 3:
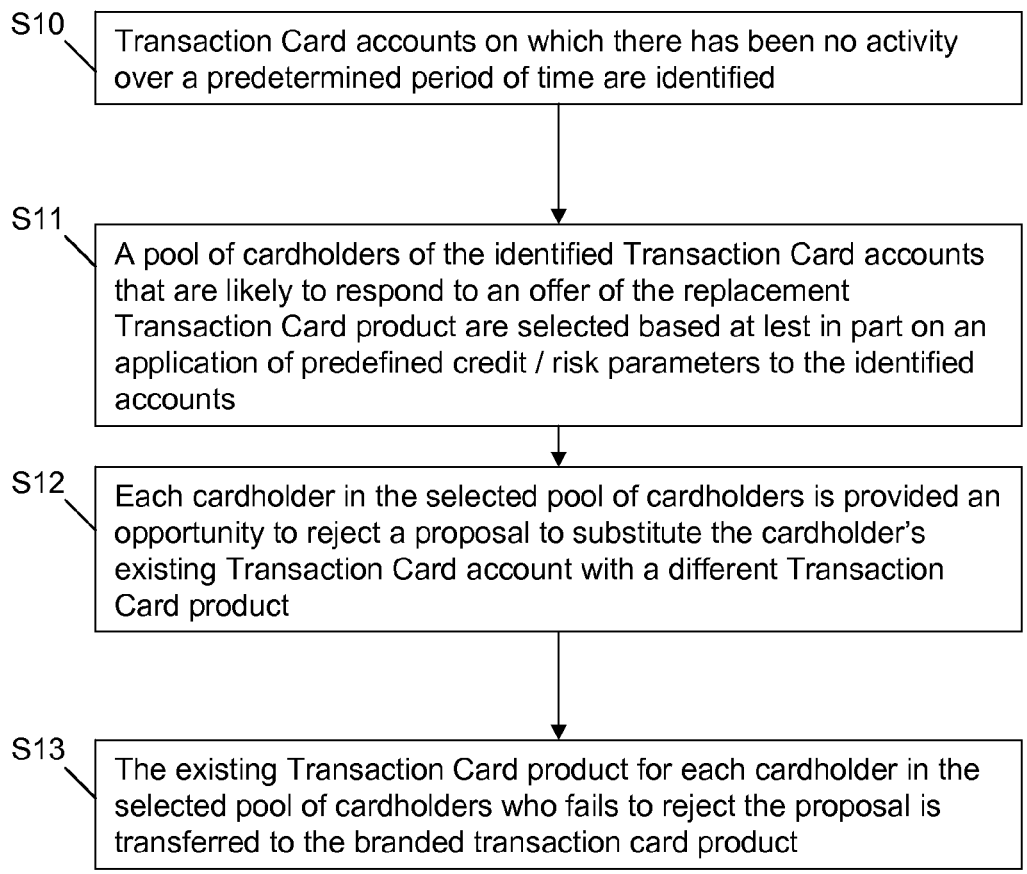
FIG. 3 is a flow chart that illustrates an example of the process of substituting an existing Transaction Card product with a different Transaction Card product upon the occurrence of a predetermined level of account inactivity for embodiments of the invention.

FIG. 3 is a flow chart that illustrates an example of the process of substituting existing Transaction Card accounts with a different Transaction Card product upon the occurrence of a predetermined level of account inactivity for embodiments of the invention. Referring to FIG. 3, at S10, Transaction Card accounts on which there has been no activity over a predetermined period of time are identified, and at S11, a pool of cardholders of identified Transaction Card accounts that are likely to respond to an offer of the replacement Transaction Card product are selected based at least in part on an application of predefined credit/risk parameters to the identified accounts. Thereafter, at S12, each cardholder in the selected pool of cardholders may be provided an opportunity to reject a proposal to substitute the cardholder's existing Transaction Card account with a different Transaction Card product and at S13, the existing Transaction Card for each cardholder in the selected pool of cardholders who fails to reject the proposal is transferred to the replacement Transaction Card product The second aspect involves, for example, identifying longer term inactive cardholders (i.e., people who have not used their Transaction Card product for a certain number months) and offering them a different Transaction Card product, such as a MASTERCARD® product, with essentially the same value proposition as in the first aspect described above. Thus, the second aspect of embodiments of the invention involves criteria based identification and succession of such cardholders from their existing Transaction Card product to the replacement Transaction Card product.

The succession process for the second aspect of embodiments of the invention is a criteria-based target model that is based primarily on a level of inactivity by the cardholder on the existing Transaction Card product. The particular level of inactivity selected can depend on a number of factors, including, without limitation, any restrictions in a Private Label or Co-brand Agreement. For example, the level of inactivity can range from six or less months inactivity to forty-eight or more months inactivity or anywhere in between, depending at least in part on whether there are any limitations in a Private Label or Co-brand Agreement.

In the succession process for the second aspect, once accounts are selected based on their level of inactivity, credit/ risk criteria are applied against those accounts to determine which cardholder is most likely to respond to a replacement Transaction Card product offer. The selection process for the second aspect yields a pool of selected accounts deemed ready for succession from the existing Transaction Card product to the replacement Transaction Card product.

Thereafter, members of the pool of selected accounts may be given an opportunity to opt out of the succession program via what is referred to as a pre-notification which is sent, for example, by regular mail to the cardholder for each of the selected accounts. The pre-notification identifies or introduces the replacement Transaction Card product and value proposition to the cardholder.

Further, the pre-notification gives the cardholder an opportunity to opt out or decline the replacement Transaction Card product. Mailing of the pre-notifications are done, for example, within a pre-determined time, such as 45 days, of the replacement Transaction Cards being issued. Once cardholders identify themselves as either expressly opting out or expressly not opting out, the replacement Transaction Card is sent to each cardholder who did not expressly opt out.

As previously noted, the replacement Transaction Card for the second aspect of embodiments of the invention provides essentially the same value proposition as the first aspect. Thus, the value proposition for the second aspect includes, for example, pricing benefits, such as zero percent APR for purchases over pre-determined sums for a pre-determined periods of time, and paying off balances subject to promotional APRs after first paying off balances at higher APRs instead of the industry standard of paying off balances at low APR s first.

It is to be understood that the pricing benefits, such as zero percent APR for pre-determined periods of time for purchases over pre-determined sums are not introductory rates but are instead an ongoing value proposition. In other words, the pricing benefits are not phased out after a certain introductory period of time after an account is opened. On the contrary, the zero percent APR is a feature of the account that remains available to the cardholder for each purchase over one of the pre-determined sums for one of the pre-determined time periods after such purchase.

It is to be further understood that computer hardware and software, including, without limitation, instructions embodied in program code encoded on machine readable medium are utilized to provide functionality for implementing both aspects of embodiments of the invention.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A method for managing transaction card accounts, comprising:

accumulating by a first computer software application process tangibly embodied in a physical program storage device executing on a physical computer hardware machine transaction charge balances for a plurality of cardholders on transaction card accounts to which a private label or co-branded agreement is related associated with existing transaction cards provided for each of the cardholders;

identifying by a second computer software application process tangibly embodied in a physical program storage device executing on a physical computer hardware machine an occurrence of a condition consisting of one of termination of said private label or co-branded agreement related to said transaction card accounts of at least a portion of the plurality of cardholders and a predetermined level of inactivity on said transaction card accounts of at least a portion of the plurality of cardholders; and substituting by a third computer software application process tangibly embodied in a physical program storage device executing on a physical computer hardware machine the existing transaction card account to which said private label or co-branded agreement is related for each card holder of the at least said portion of the plurality of cardholders with a different transaction card account, which different transaction card account is unrelated to said private label or co-branded agreement and which is usable in a greater number of transaction types and with a greater number of merchants than the transaction card accounts to which said private label or co-branded agreement is related, upon said occurrence of the condition consisting of one of termination of said private label or co-branded agreement related to said transaction card accounts of at least a portion of the plurality of cardholders and a predetermined level of inactivity on said transaction card accounts of at least a portion of the plurality of cardholders.

2. The method of claim 1, wherein accumulating the transaction charge balances on the transaction card accounts for the cardholders further comprises accumulating the transaction charge balances on private label or co-branded transaction card accounts provided for each of the cardholders pursuant to the private label or co-branded agreement.

3. The method of claim 1, wherein substituting the existing transaction card account with the different transaction card account upon the occurrence of the condition further comprises substituting a private label or co-branded transaction card account with a different transaction card account upon termination of the private label or co-brand agreement by a card issuer or a third party.

4. The method of claim 1, wherein substituting the cardholder's existing transaction card account with the different transaction card account upon the occurrence of the condition further comprises substituting the transaction card account with a different transaction card account which provides a first predetermined promotional annual percentage rate of interest for any purchase over a first predetermined sum for a first pre-determined period of time.

5. The method of claim 4, wherein substituting the cardholder's existing transaction card account with a different transaction card account upon the occurrence of the condition further comprises substituting the existing transaction card account with a different transaction card account which provides a second predetermined promotional annual percentage rate of interest for any purchase over a second pre-determined sum that is greater than the first predetermined sum for a second predetermined period of time that is greater than the first predetermined period of time.

6. The method of claim 5, wherein the first and second predetermined promotional annual percentage rates are less than a predetermined non-promotional annual percentage rate.

7. The method of claim 1, wherein substituting the cardholder's existing transaction card account with a different transaction card account upon the occurrence of the condition further comprises substituting the existing transaction card account with a different transaction card account which provides a payment hierarchy in which payments are applied to balances accruing interest at non-promotional annual percentage rates of interest before balances accruing interest at a promotional annual percentage rate of interest.

8. The method of claim 1, wherein substituting the existing transaction card account with a different transaction card account upon the occurrence of the predetermined level of inactivity on said transaction card accounts further comprises identifying transaction card accounts on which there has been no activity over a predetermined period of time.

9. The method of claim 8, wherein substituting the existing transaction card account with a different transaction card account upon the occurrence of the predetermined level of inactivity on the existing transaction card accounts further comprises selecting a pool of cardholders of identified transaction card accounts based at least in part on an application of predefined credit/risk parameters to the identified accounts.

10. The method of claim 9, wherein substituting the existing transaction card account with a different transaction card account upon the occurrence of the predetermined level of inactivity on the existing transaction card accounts further comprises providing at least some cardholders in the selected pool of cardholders an opportunity to reject a proposal to substitute the cardholder's existing transaction card account with a different transaction card account.

11. The method of claim 10, wherein substituting the existing transaction card account with a different transaction card account upon the occurrence of the predetermined level of inactivity on the existing transaction card account further comprises substituting the existing transaction card account with a different transaction card account for each cardholder in the selected pool of cardholders who fails to reject the proposal to substitute.

12. A system for managing transaction card accounts, comprising:
   a first computer software application process tangibly embodied in a physical program storage device executing on a physical computer hardware machine that accumulates transaction charge balances for a plurality of cardholders on existing transaction card accounts to which a private label or co-branded agreement is related;
   a second computer software application process tangibly embodied in a physical program storage device executing on a physical computer hardware machine that identifies an occurrence of a condition consisting of one of termination of said private label or co-branded agreement related to said transaction card accounts of at least a portion of the plurality of cardholders and a predetermined level of inactivity on said transaction card accounts of at least a portion of the plurality of cardholders; and
   a third computer software application process tangibly embodied in a physical program storage device executing on a physical computer hardware machine that substitutes the existing transaction card account to which said private label or co-branded agreement is related for each card holder of the at least said portion of the plurality of cardholders with a different transaction card account, which different transaction card account is unrelated to said private label or co-branded agreement and which is usable in a greater number of transaction types and with a greater number of merchants than the transaction card accounts to which said private label or co-branded agreement is related, upon said occurrence of the condition consisting of one of termination of said private label or co-branded agreement related to said transaction card accounts of at least a portion of the plurality of cardholders and a predetermined level of inactivity on said transaction card accounts of at least a portion of the plurality of cardholders.

13. The method of claim 1, wherein substituting the existing transaction card account with the different transaction card account upon the occurrence of the condition further comprises providing a transaction card account to said portion of the plurality of cardholders by a card issuer with a different transaction card account having a predetermined promotional annual percentage rate of interest for any purchase over a predetermined sum for a pre-determined period of time.

* * * * *